UNITED STATES PATENT OFFICE.

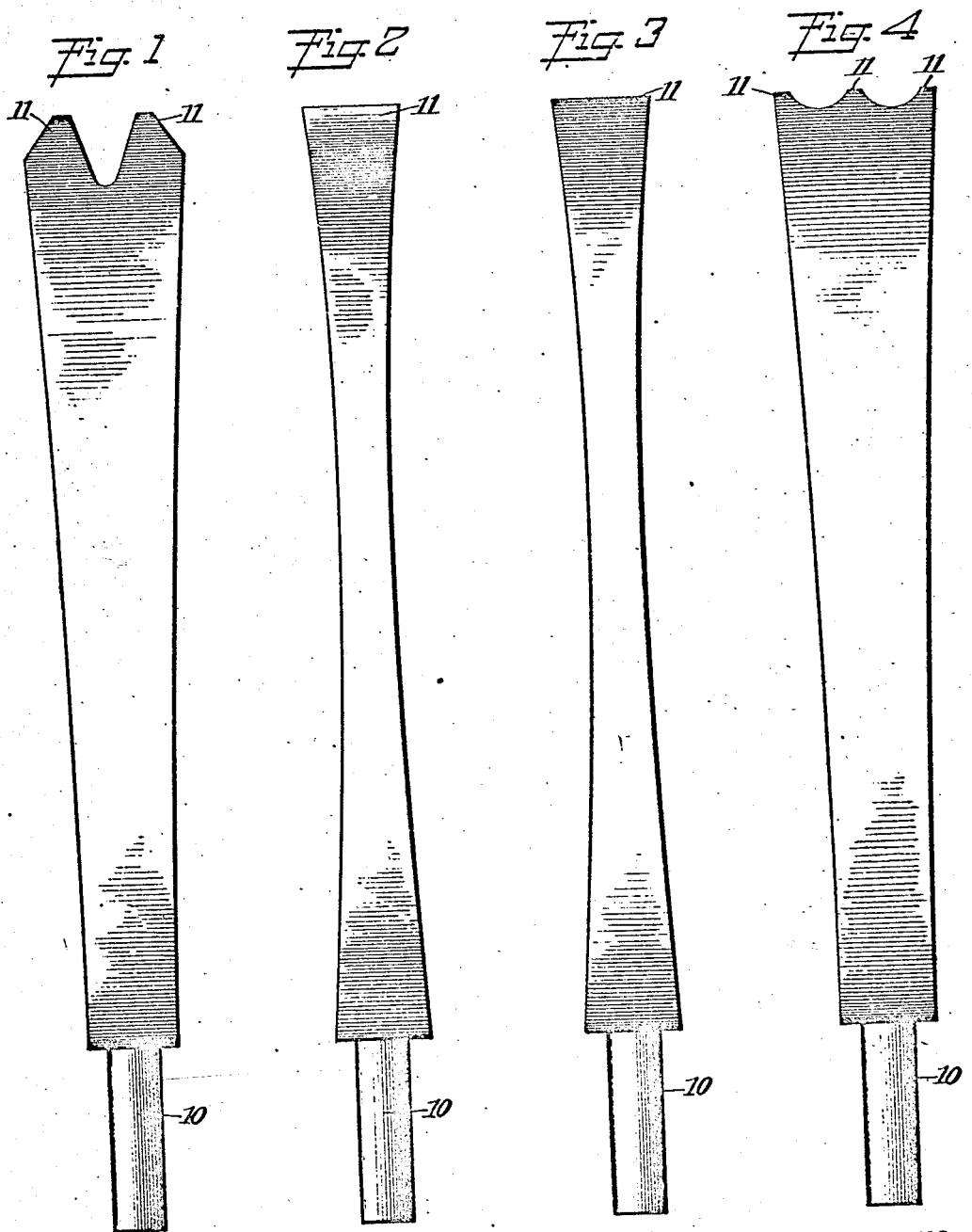

JOHN C. MERCER, OF BARRE, VERMONT.

CHANNELING-TOOL.

No. 895,387.

Specification of Letters Patent.

Patented Aug. 4, 1908.

Application filed March 26, 1908. Serial No. 423,361.

*To all whom it may concern:*

Be it known that I, JOHN C. MERCER, a citizen of the United States, and a resident of Barre, in the county of Washington and State of Vermont, have invented a new and Improved Channeling-Tool, of which the following is a full, clear, and exact description.

This invention is an improvement in stone and rock cutting tools, and is designed as a channeling tool, in which capacity it is especially useful in the working of granite.

At granite quarries and stone dressing works it is frequently necessary to remove or cut one large piece of granite from another. The usual practice is to do this by drilling a series of holes along the line the stone is to be cut and then break the stone out through the holes. This operation entails considerable time and labor and necessitates considerable dressing of the stone where broken out, owing to the furrows left by the drill holes. By the use of a tool constructed in accordance with my invention, when used in a pneumatic or other power drilling machine, a channel is rapidly cut along the line the stone is to be divided, and very little, if any, dressing on the faces formed by the channel is required.

Reference is to be had to the accompanying drawings forming a part of this specification, in which similar characters of reference indicate corresponding parts in all the views.

Figure 1 is a side elevation of a stone channeling tool embodying my invention; Fig. 2 is an edge view of the same; Fig. 3 is an edge view of a modified form of my improved channeling tool; Fig. 4 is a side elevation of the same; Fig. 5 is an end view of the tool shown in Figs. 1 and 2; and Fig. 6 is an end view of the tool shown in Figs. 3 and 4.

The tool is constructed of steel and preferably has the conventional cylindrical shank 10 for fitting within the socket of a pneumatic or other power drilling machine. The body of the tool on its wide or side face tapers from the shank to the point, with the enlarged end arranged at the cutting edge, and the side edge of the said body is preferably made thinner at the center and tapers both to the point and to the cutting edge, at which points the metal is somewhat thickened.

The cutting edge of the tool, which is the principal feature of the invention, is formed by cutting one or more transverse notches in the end to form a suitable number of cutting teeth 11, these teeth being flattened on the point, as clearly shown in Figs. 1 and 4. In Figs. 1, 2 and 5 I have shown the notch separating the teeth as centrally arranged, producing two teeth which are beveled off at the outside. In Figs. 3, 4 and 6, three teeth are provided, the outer teeth being arranged at the edges and adapted to cut a channel having square corners at the bottom, whereas the cutting edge of the tool shown in the other figures will cut on the bevel, and is more especially intended for roughing purposes.

I have found in practice that a tool constructed in accordance with my invention considerably saves in both time and labor over the usual method of working granite, and can be used to great advantage in hollowing vases, cutting windows in vaults, cutting steps and such other similar work; also, after the stone has been cut, no further dressing is generally needed.

Having thus described my invention, I claim as new and desire to secure by Letters Patent:

1. A tool for channeling stone, having a thickened point provided with a cross notch forming flattened teeth.

2. A tool for channeling stone, tapering in both width and thickness, with the enlarged portion arranged at the point where it is provided with a transverse notch forming flattened cutting teeth.

3. A tool for channeling stone, tapering in both width and thickness, with the enlarged portion arranged at the point, and transverse teeth formed on said point, having straight parallel cutting edges.

In testimony whereof I have signed my name to this specification in the presence of two subscribing witnesses.

JOHN C. MERCER.

Witnesses:
 JOHN WATT,
 JAMES MACKAY.